(12) United States Patent
Kawada (10) Patent No.: US 7,002,313 B2
(45) Date of Patent: Feb. 21, 2006

(54) ELECTRIC POWER STEERING DEVICE CONTROL APPARATUS

(75) Inventor: Hideaki Kawada, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/508,027

(22) PCT Filed: Mar. 10, 2003

(86) PCT No.: PCT/JP03/02788

§ 371 (c)(1),
(2), (4) Date: Sep. 16, 2004

(87) PCT Pub. No.: WO03/078237

PCT Pub. Date: Sep. 25, 2003

(65) Prior Publication Data

US 2005/0156548 A1    Jul. 21, 2005

(30) Foreign Application Priority Data

Mar. 18, 2002    (JP)    ............................. 2002-073861

(51) Int. Cl.
   B62D 6/00    (2006.01)
   B62D 5/04    (2006.01)
(52) U.S. Cl. .................. 318/564; 318/568.24; 388/903
(58) Field of Classification Search ................ 318/293, 318/563–566, 568.24; 388/903, 907.2, 909; 180/443

See application file for complete search history.

(56) References Cited

U.S. PATENT DOCUMENTS

| 5,303,156 A | * | 4/1994 | Matsuoka et al. ............ 701/43 |
| 6,373,217 B1 | * | 4/2002 | Kawada et al. ............. 318/564 |
| 6,837,331 B1 | * | 1/2005 | Kawada et al. ............. 180/446 |
| 6,907,334 B1 | * | 6/2005 | Yoshida et al. ............... 701/41 |

FOREIGN PATENT DOCUMENTS

| JP | 4-78662 A | 3/1992 |
| JP | 5-20976 U | 3/1993 |
| JP | 8-91240 A | 4/1996 |
| JP | 10-029555 A | 2/1998 |

(Continued)

Primary Examiner—Bentsu Ro
(74) Attorney, Agent, or Firm—Sughrue Mion, PLLC (57) ABSTRACT

An object of the present invention is to provide a controller for an electric power steering apparatus which has a function capable of detecting abnormality of motor current detection circuits even while a steering operation is being executed and can execute alternate control when a failure is detected. This object is achieved by a controller for an electric power steering apparatus for controlling a motor so that a steeling assist power is applied to a steering mechanism based on a current command value calculated from a steering assist command value calculated based on a steering torque, which is generated in a steering shaft, and from a motor current detection value. The controller has a function for determining a failure of a plurality of motor current detection circuits by detecting a current flowing in the motor by a single current detecting resistor, inputting the detected signal to the of motor current detection circuits in parallel, and comparing outputs from the motor current detection circuits.

10 Claims, 11 Drawing Sheets

FOREIGN PATENT DOCUMENTS

| | | |
|---|---|---|
| JP | 10-167086 A | 6/1998 |
| JP | 10-203392 A | 8/1998 |
| JP | 11-29055 A | 2/1999 |
| JP | 11-049002 A | 2/1999 |
| JP | 3063896 B2 | 5/2000 |
| WO | WO 98/33270 A1 | 7/1998 |
| WO | WO 98/58833 A1 | 12/1998 |
| WO | WO 03/078237 A1 * | 9/2003 |

* cited by examiner

ELECTRIC POWER STEERING DEVICE CONTROL APPARATUS

TECHNICAL FIELD

The present invention relates to a controller for an electric power steering apparatus having a function that can detect abnormality of a motor current detection circuit even while a steering operation is being executed and can execute alternate control when it is detected that the motor current detection circuit fails.

BACKGROUND ART

An electric power steering apparatus, which urges a steering apparatus of an automobile or a vehicle with an assist load using rotational force of a motor, auxiliarily applies driving force of the motor to a steering shaft or a rack axis through a transmission mechanism such as gears or belts via a reduction gear.

Such a conventional electric power steering apparatus executes a feedback control of a motor current for accurately generating an assist torque (a steering assist torque).

The feed back control is to adjust a motor impressed voltage so as to reduce a difference between a current command value and a motor current detection value. The motor impressed voltage is generally adjusted based on a duty ratio of pulse width modulation (PWM) control.

Figure 9:
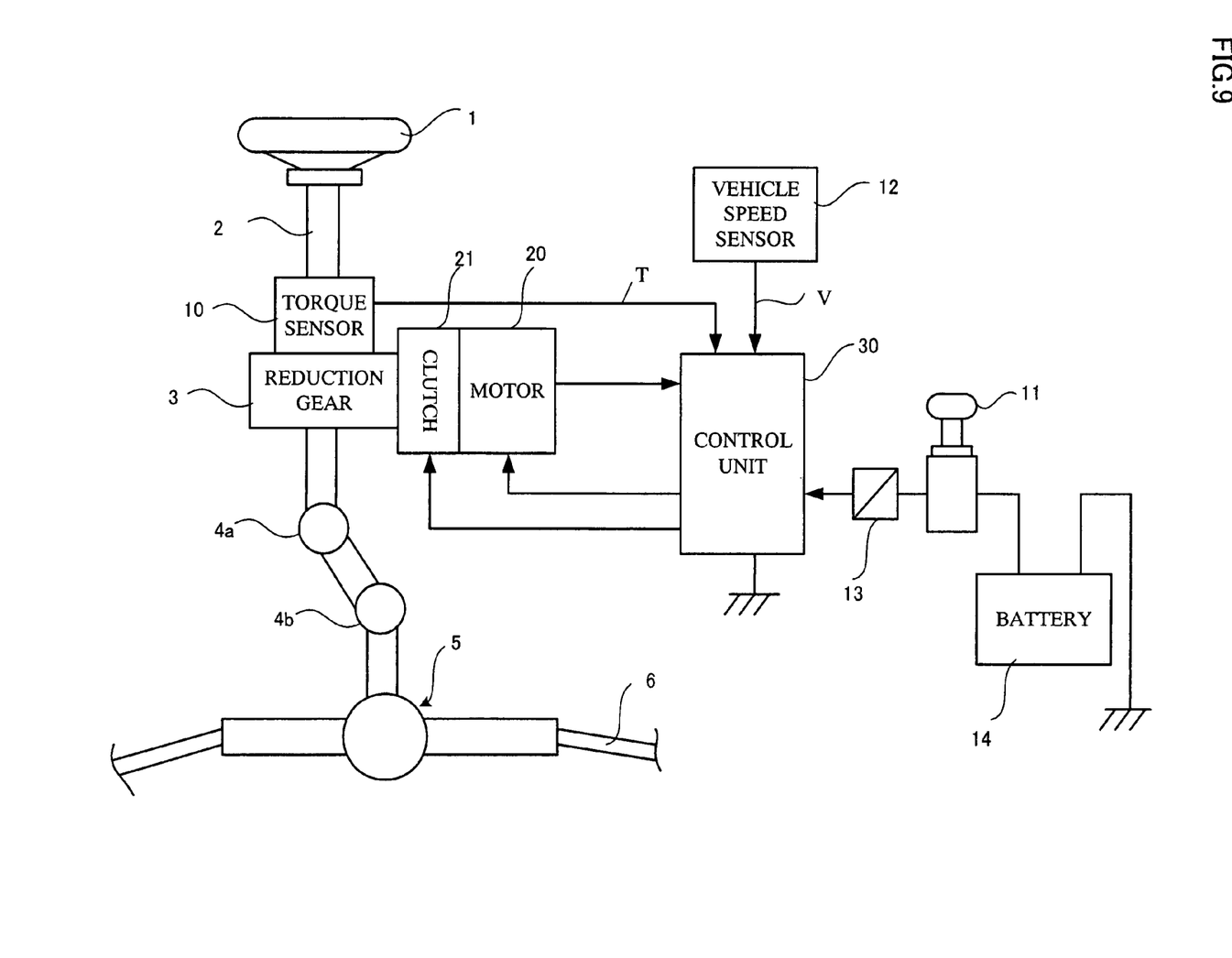
FIG. 9 is a view showing a schematic structure of an electric power steering apparatus.

A general structure of the electric power steering apparatus will be explained below with reference to FIG. 9. A shaft 2 of a steering wheel 1 is connected to a tie rod 6 of running wheels through a reduction gear 3, universal joints 4a and 4b, and a pinion rack mechanism 5. The shaft 2 is provided with a torque sensor 10 for detecting a steering torque of the steering wheel 1. A motor 20 for assisting the steering force of the steering wheel 1 is connected to the shaft 2 through a clutch 21 and the reduction gear 3. A control unit 30 for controlling the power steering apparatus is supplied with power from a battery 14 through an ignition key 11 and a relay 13. The control unit 30 calculates a steering auxiliary command value I of an assist command based on a steering torque T detected by the torque sensor 10 and a vehicle speed V detected by a vehicle speed sensor 12. The control unit 30 then controls a current to be supplied to the motor 20 based on the calculated steering auxiliary command value I. The clutch 21 is turned on and off by the control unit 30 and is turned on (coupled) in an ordinary operating state. When it is determined by the control unit 30 that the power steering apparatus fails and when the power (voltage Vb) of the battery 14 is turned off by the ignition key 11 and the relay 13, the clutch 21 is turned of (disconnected).

Figure 10:
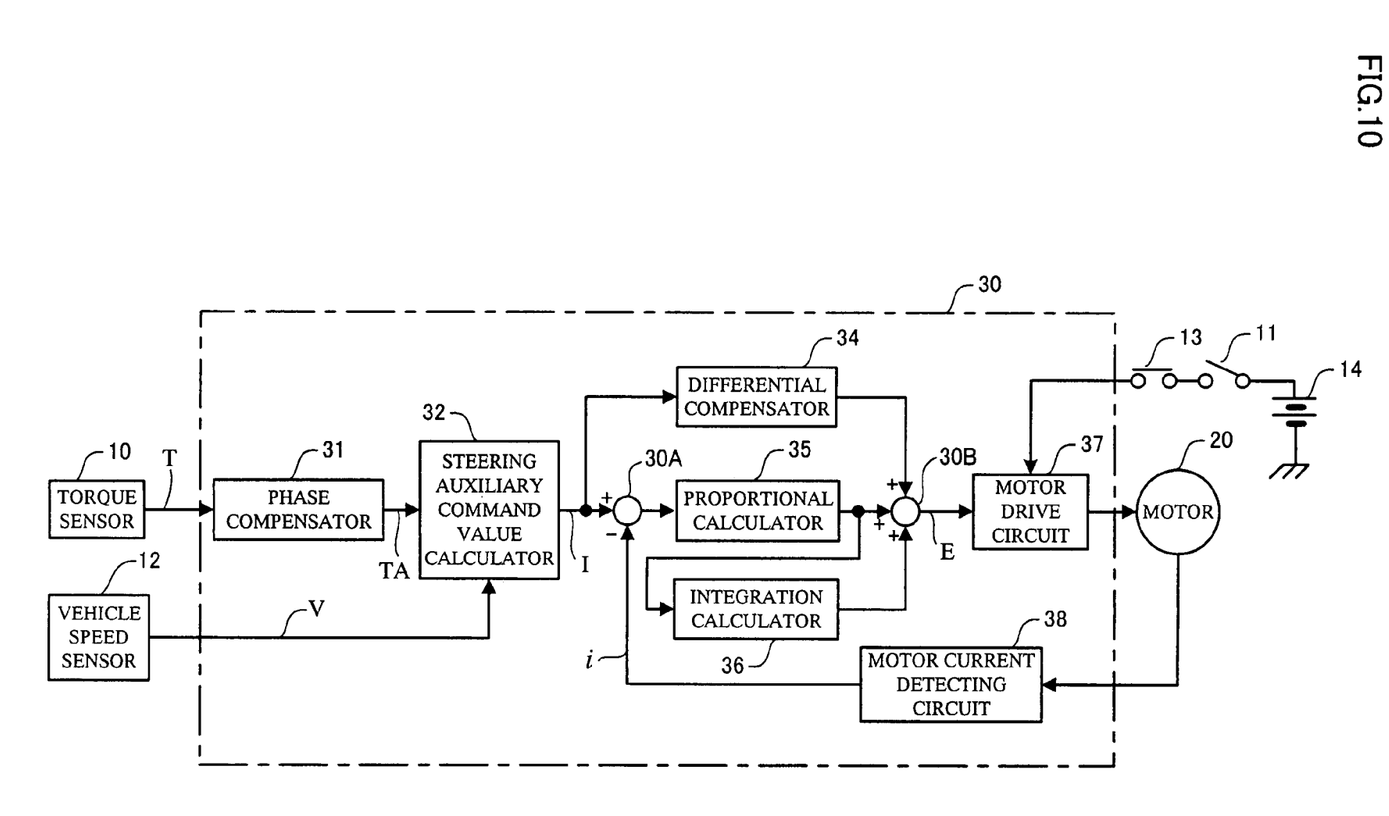
FIG. 10 is a block diagram showing an example of a controller of the electric power steering apparatus.

The control unit 30 is mainly composed of a CPU. FIG. 10 shows general functions to be executed based on a program inside the CPU. For example, a phase compensator 31 does not show a phase compensator as independent hardware and shows a phase compensation function executed by the CPU. Functions and operation of the control unit 30 will be explained below. A steering torque T detected by the torque sensor 10 and then input is phase-compensated by the phase compensator 31 for increasing the stability of the steering system. Phase-compensated steering torque TA is input to a steering auxiliary command value calculator 32. The vehicle speed V detected by the vehicle speed sensor 12 is also input to the steering auxiliary command value calculator 32. The steering auxiliary command value calculator 32 determines a steering auxiliary command value I as a control target value of a current to be supplied to the motor 20, based on the input steering torque TA and the input vehicle speed V. The steering auxiliary command value I is input to a subtracter 30A, and is also input to a differential compensator 34 of a feed-forward system for increasing a response speed. A difference (I-i) calculated by the subtracter 30A is input to a proportional calculator 35, and a proportional output from the proportional calculator 35 is input to an adder 30B and is also input to an integration calculator 36 for improving the characteristic of a feedback system. Outputs from the differential compensator 34 and the integration calculator 36 are also input to and added together by the adder 30B. A result of the addition by the adder 30B is obtained as a current command value E, and this is input to a motor driving circuit 37 as a motor driving signal. A motor current value i of the motor 20 is detected by a motor current detection circuit 38, and this motor current value i is input to the subtracter 30A and is fed back.

When, however, the motor current detection circuit 38 fails, an accurate motor current cannot be measured. As a result, a disadvantage arises in that an excessive current flows to the motor and an excessive assist torque is generated thereby or a necessary amount of a current does not flow to the motor and a sufficient assist torque cannot be obtained.

Further, when a current is caused to flow to the motor to confirm operation of the motor current detection circuit 38, the motor is rotated and the steering wheel 1 is turned when the clutch 21 is connected, from which an unexpected accident may occur.

Accordingly, it is a very important problem to provide a means for determining a failure of the motor current detection circuit to prevent an accident. Heretofore, the inventors of the present invention have made a proposal for solving the above problem (Jpn. Pat. Appln. KOKAI Publication No. 8-91240).

The conventional motor current detection circuit is arranged such that a voltage, which is generated by a current flowing through a current detection resistor, is peak-held so as to amplify the signal thereof, and a current of a motor is controlled and a failure of the motor is detected using the signal.

Abnormality of the conventional current detection circuit is detected for the purpose of detecting an abnormal drift voltage of the current detection circuit caused by a failure just after a steering apparatus is shipped (initial diagnosis). In the detection of the abnormality, a value of a drift voltage, which is previously stored (at the time of shipment), when a current is detected, is compared with a value of a drift voltage detected immediately after an ignition switch is turned on, and it is diagnosed whether a difference between the former value and the latter value is more increased or more reduced than a predetermined value (initial diagnosis).

Further, in order to detect a failure of the current detection circuit due to short-circuit occurred therein, a current is caused to flow to the motor for a period of time longer than an electric time constant of the motor and shorter than a mechanical time constant thereof, and it is confirmed whether or not the current flows in an amount larger than a predetermined current value (Jpn. Pat. Appln. KOKAI Publication No. 8-91240).

Figure 11:
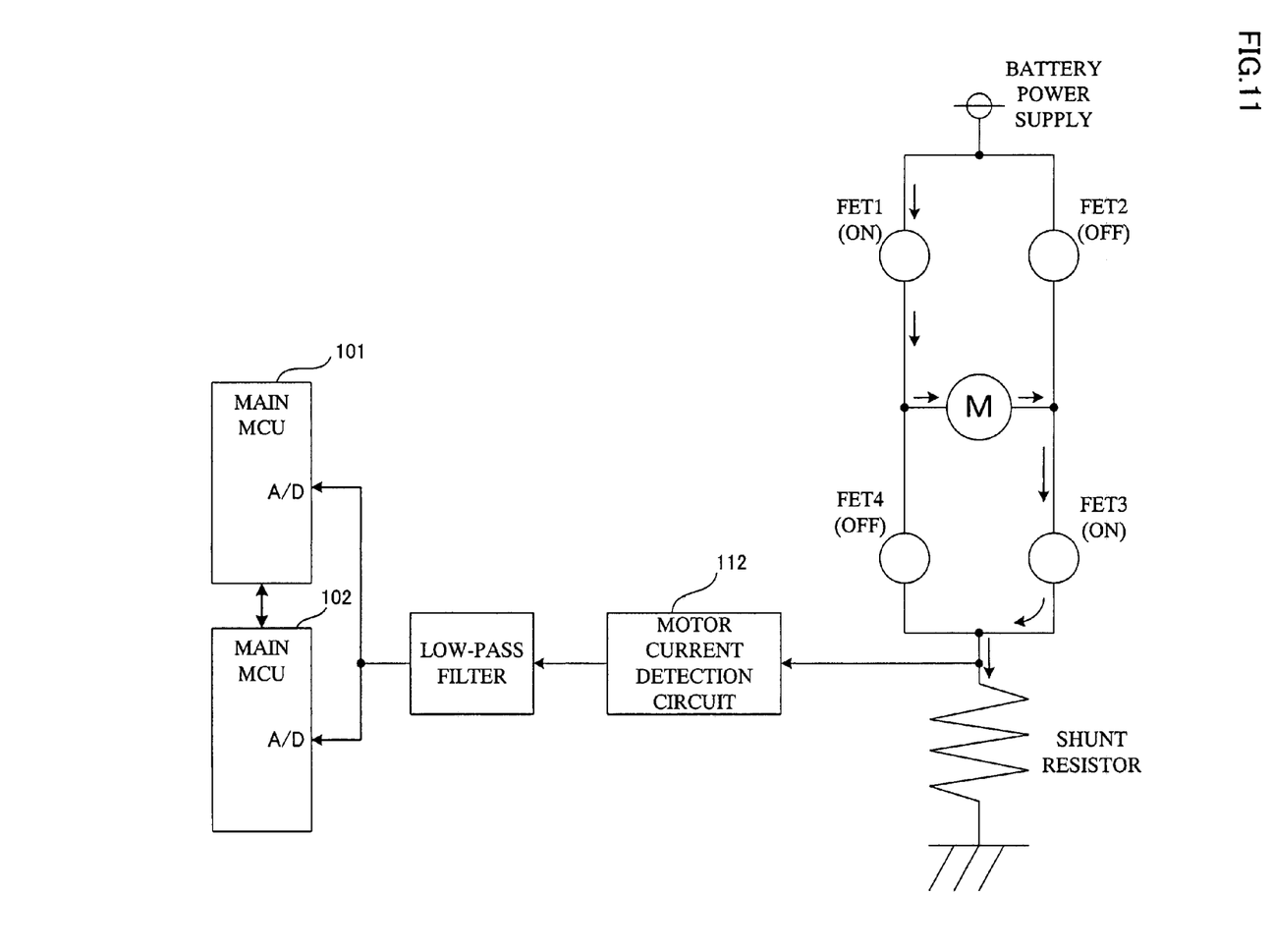
FIG. 11 is a view showing a conventional example of an apparatus for diagnosing a failure of a motor current detection circuit.

Further, in order to enhance controllability and safety, the inventors have proposed to use two MCUs, i.e. a main MCU and a sub MCU and to input the current detection signal to the main MCU and to the sub MCU by branching it thereto so that a current is controlled and a failure is detected as shown in FIG. 11 (Jpn. Pat. Appln. KOKAI Publication No. 2001-18819).

More specifically, in FIG. 11, a voltage, which is generated by causing a motor current i to flow through a current detecting resistor (shunt resistor), is input to a motor current detection circuit 112 and input to the main MCU 101 and the sub MCU 102 passing through a low-pass filter. Accordingly, when one of the MCUs fails, the voltage input thereto is different from that input to the other MCU, which permits a failure of the MCUs to be found easily, thereby the controllability and the safety can be enhanced.

When it is determined by the abnormality detection means as described above that the current detection circuit fails, motor current control is interrupted, and the steering apparatus is placed in an assist stop state.

However, even if the controllability and the safety are enhanced by providing the two MCUs as described above, there remain three problems as described below.

First, a failure of a current amplifier of the motor current detection circuit cannot be accurately detected.

That is, a failure of the current amplifier of the motor current detection circuit cannot be detected, in particular, the failure cannot be detected when it occurs while a steering operation is being executed. If the current amplifier fails while the steering operation is being executed and a motor detection current becomes smaller than a normal value, it is determined by the current control executed in the MCUs that the motor detection current is smaller than a current command value, and a current larger than a predetermined current value flows to the motor. When a driver steers a vehicle in the above state, a torque becomes larger than an estimated assist torque, from which a possibility arises in that a steering wheel is excessively jerked or placed in an unstable state accompanied with vibration.

To cope with the above problem, there is required an abnormality detection means for determining whether or not the current amplifier of the motor current detection circuit is normal or not.

Second, a failure of the motor current detection circuit cannot be detected when a motor current is controlled (when motor current control is executed).

While the motor current control is being executed, it is executed by making a current control calculation by the MCUs. Accordingly, in order to detect the failure of the motor current detection circuit, a failure thereof due to offset and short-circuit must be detected by interrupting the motor current control calculation once.

Accordingly, abnormality of the motor current detection circuit cannot be detected by diagnosis other than the initial diagnosis.

However, since electronic parts may fail accidentally, it is necessary to diagnose a failure of the motor current detection circuit while it is in operation.

Third, the assist must be interrupted when the motor current detection circuit fails, which means that any alternate control means is not provided.

Conventionally, when it is diagnosed in the initial diagnosis that the motor current detection circuit fails, an assist control must be stopped thereafter because there is no means for normally detecting a motor current.

An object of the present invention, which was made to solve the above problems, is to provide a controller for an electric power steering apparatus which can accurately detect a failure of a current amplifier of a motor current detection circuit, has a function capable of detecting abnormality of the motor current detection circuit even while a vehicle is being steered, and can execute alternate control when a failure is detected.

DISCLOSURE OF INVENTION

The present invention relates to a controller for an electric power steering apparatus having a function that can detect abnormality of a motor current detecting circuit even during a steering operation and can execute alternate control when a failure is detected. The object of the present invention can be achieved by a controller for an electric power steering apparatus for controlling a motor so that a steeling assist power is applied to a steering mechanism based on a current command value calculated from a steering assist command value calculated based on a steering torque, which is generated in a steering shaft, and from a motor current detection value. The controller has a function for determining a failure of a plurality of motor current detection circuits by detecting a current flowing in the motor by a single current detecting resistor, inputting the detected signal to the of motor current detection circuits in parallel, and comparing outputs from the motor current detection circuits.

The object of the present invention can be effectively achieved by the controller for the electric power steering which includes two MCUs, i.e. a main MCU and a sub MCU and in which the plurality of motor current detection circuits are composed of two motor current detection circuits, one of output data of the two motor current detection circuits is input to the main MCU, the other output data is input to the sub MCU, the data of at least any one of the MCUs is sent to the other MCU through a communication therebetween, the other MCU determines a difference between the data, and when the difference exceeds a predetermined value, it is determined that at least one of the motor current detection circuits fails.

Further, the object of the present invention can be achieved by arranging the controller for the electric power steering apparatus; such that, in initial diagnosis of the failure of the motor current detection circuits, a current is caused to flow to the motor for a period of time longer than an electric time constant of the motor and shorter than a mechanical time constant thereof, as a result, the data of at least any one of the MCUs of output data of the two motor current detection circuits which are input to the main MCU and the sub MCU, respectively, is sent to the other MCU through a serial communication therebetween, the other MCU determines a difference between the respective data, and when the difference exceeds a predetermined value, it is determined that at least one of the motor current detection circuits fails; such that the data of at least one of the MCUs is sent to the other MCU through a serial communication therebetween executed at every predetermined time while a motor current is being controlled, the other MCU determines a difference between the respective data, and when the difference exceeds a predetermined value, it is determined that at least one of the motor current detection circuits fails; such that when the two data are compared with each other and a difference therebetween exceeds a predetermined value, the motor current control, which is executed based on the current command value calculated from the steering assist command value calculated based on the steering torque and from the motor current command value, is interrupted, at least any one of the MCUs forcibly drives the motor in response to a PWM signal having a predetermined duty based on a battery voltage, and a failed motor current detection circuit is identified by comparing a current detected by the forcible drive with a current estimated from the battery voltage and the duty of the PWM; and such that the motor current control is continued based on an output from a motor current detection circuit which is determined normal in place of a motor current detection circuit whose failure is identified.

BEST MODE FOR CARRYING OUT THE INVENTION

The present invention is mainly characterized in that two motor current detection circuits are provided, an output from one of the motor current detection circuits is input to a main MCU, an output from other motor current detection circuit is input to a sub MCU, and the motor current detection values detected by the respective motor current detection circuits are compared with each other between the main MCU and the sub MCU, thereby a failure of at least one of both the motor current detection circuits is detected.

Embodiments of the present invention will be explained below in detail with reference to the drawings.

Figure 1:
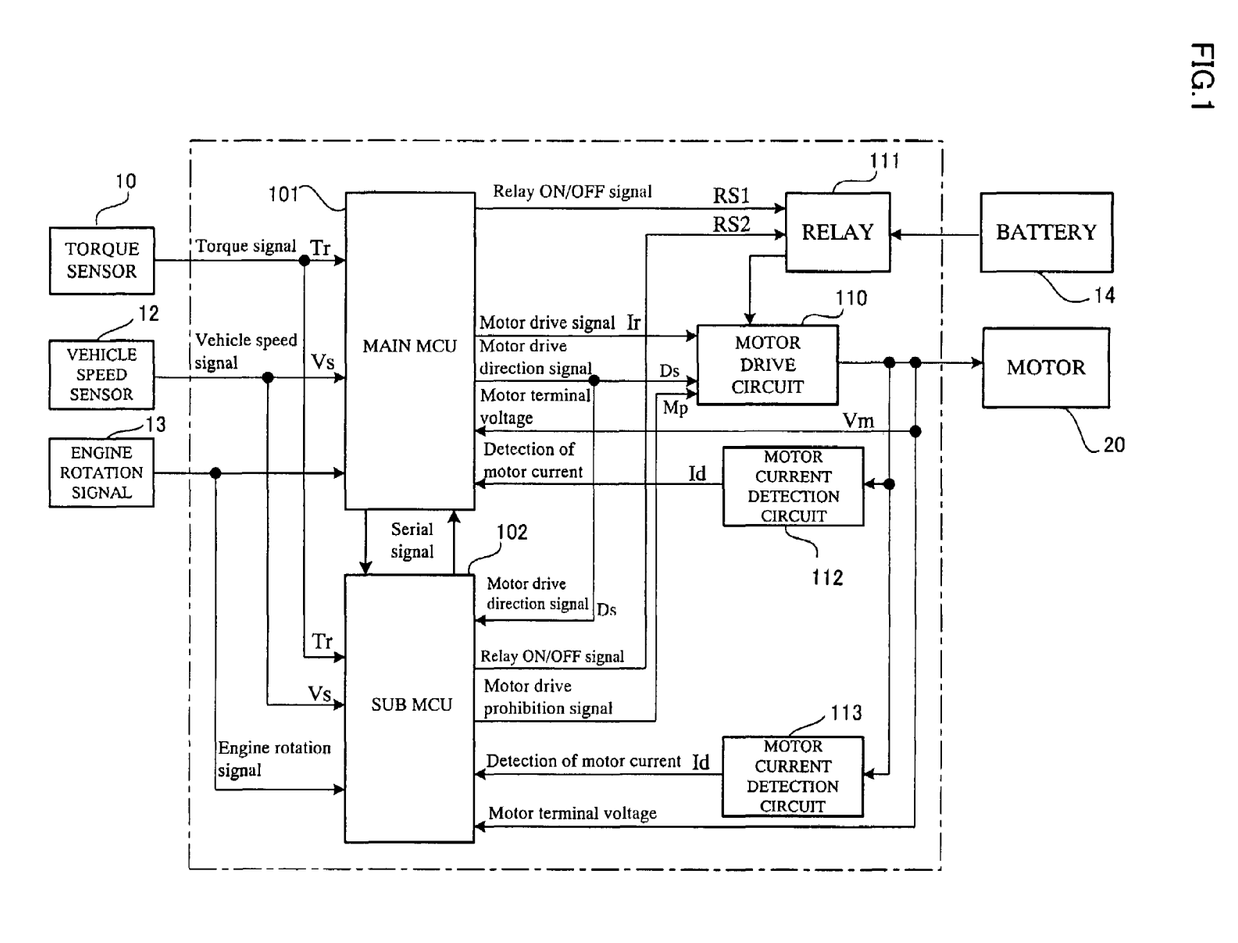
FIG. 1 is a block diagram of an overall structure showing an embodiment of the present invention.

FIG. 1 is a block diagram of an overall structure showing an embodiment of the present invention, wherein a torque signal Tr from a torque sensor 10, a vehicle speed signal Vs from a vehicle speed sensor 12, and an engine rotation signal are input to the main MCU 101 and the sub MCU 102. A motor drive signal Ir calculated by the main MCU 101 is input to a motor drive circuit 110, which drives a motor 20 based on the motor drive signal Ir.

Note that each of the main/sub MCUs has functions of a phase compensator, a steering assist command value calculator, a differential compensator, a proportional calculator, an integration calculator, a subtracter (30A), and an adder (30B) shown in FIG. 10 described above.

A relay 111, which turns on and off an input to a battery 14, is turned on and off in response to a relay ON/OFF signal RS1 output from the main MCU 101 and to a relay ON/OFF signal RS2 output from the sub MCU 102. A current of the motor 20 is detected by the motor current detection circuits 112 and 113. Respective motor current detection values Id are input to the main MCU 101 and the sub MCU 102 together with a motor terminal voltage Vm. A motor drive prohibition signal Mp output from the sub MCU 102 is input to a motor drive circuit 110.

Further, the sub MCU 102 determines a motor drive direction of a motor current command value calculated by it as well as a motor drive direction signal Ds, which is output from the main MCU 101 to the motor drive circuit 110, is input to the sub MCU 102. The sub MCU 102 determines whether or not the calculation of the main MCU 101 is executed normally by comparing both the directions.

Although both the main MCU 101 and the sub MCU 102 create the motor drive signals (current command values) Ir based on the torque signal Tr, the vehicle speed signal Vs, the current detection value Id, and the motor terminal voltage Vm, only the motor drive signal (current command value) Ir from the main MCU 101 is input to the motor drive circuit 110.

The main MCU 101 executes motor current control based on the motor current detection signal input thereto. Further, the motor current detection value input to the main MCU 101 is sent also to the sub MCU 102 through a serial communication executed between the main MCU 101 and the sub MCU 102.

Figure 2:
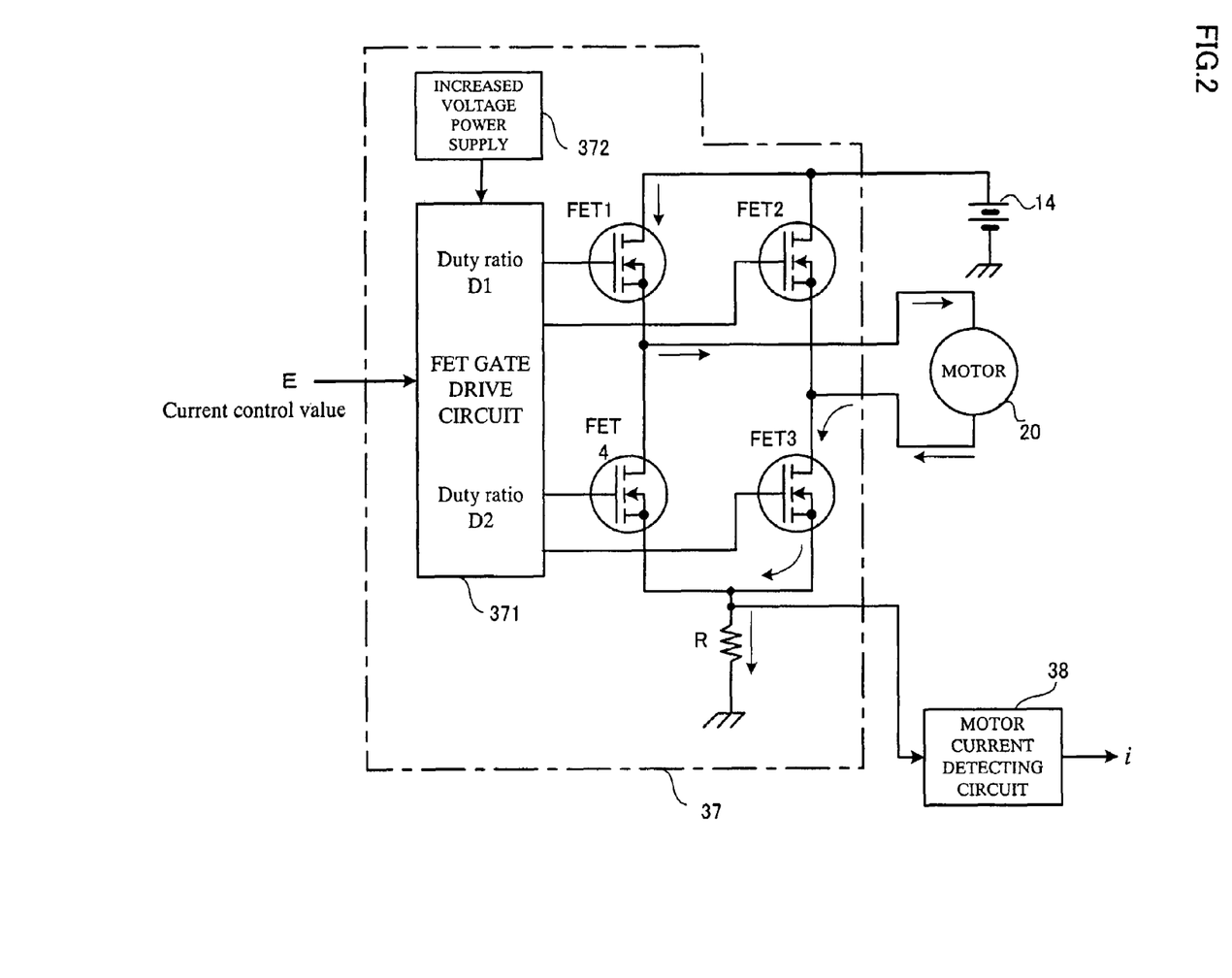
FIG. 2 is a view showing an example of a structure of a motor drive circuit.

An example of a structure of a motor drive circuit 37 will be explained with reference to FIG. 2. The motor drive circuit 37 is composed of an FET gate drive circuit 371, which drives the respective gates of field effect transistors (hereinafter, abbreviated as FET) 1 to 4 based on a current control value E from an adder 30B (refer to FIG. 10), an H bridge circuit, which composed of the FET 1 to 4, an increased voltage power supply 372, which drives the high sides of the FETs 1 and 2, and the like. Note that the current control value E means the motor drive signal Ir and the motor drive direction signal Ds in FIG. 1.

The FETs 1 and 2 are turned on and off in response to a PWM (pulse width modulated) signal having a duty ratio D1 that is determined based on the current control value E, thereby a magnitude of a voltage actually applied to the motor is controlled. The FET 3 and 4 are driven by a PWM signal having a duty ratio D2, which is defined by a predetermined linear function expression (D2=a·D1+b, where a and b show constants) in a region in which the duty ratio D1 is small, and turned on and off according to a motor rotational direction that is determined by a sign of the PWM signal in a region in which the duty ratio D1 large. When, for example, the FET 3 is conducting, a current flows through the FET 1, the motor 20, the FET 3, and a resistor R, thereby a forward current flows to the motor 20. When the FET 4 is conducting, the current flows through the FET 2, the motor 20, the FET 4, and the resistor R, thereby a rearward current flows to the motor 20. Accordingly, the current control value E from the adder 30B also corresponds to a PWM output.

Further, a motor current detection circuit 38 detects a magnitude of a motor current value based on a voltage drop across the resistor R. The motor current value i detected by the motor current detection circuit 38 is input to the subtracter 30A and is fed back.

Further, a failure of at least one of both the motor current detection circuits can be detected in initial diagnosis by the following manner. That is, a current is caused to flow to the motor for a period of time longer than an electric time constant of the motor and shorter than a mechanical time constant thereof, resultant current values detected by the main MCU and the sub MCU are exchanged therebetween through a serial communication, both the MCUs or any one of the MCUs compares the current values or any one of the current value with an estimate current value and determines whether or not a difference between them exceeds a predetermined range.

Further, the failure of at least one of the current detection circuits can be detected also in a full-time diagnosis by exchanging the current values detected by the main MCU and the sub MCU, respectively at every determined time through the serial communication and determining whether or not a difference between the detected current values exceeds a predetermined range by both the MCUs or any one of the MCUs.

In the structure as described above, the current detection values detected by the two motor current detection circuits are compared with each other, and when a difference between them exceeds a predetermined value, motor current control based on a current command value, which is calculated from a steering assist command value calculated based on a steering torque and from the motor current command value is interrupted. Then, at least one of the MCUs forcibly drives the motor based on a battery voltage in response to a PWM signal having a duty ratio which is longer than the electric time constant of the motor and shorter than the mechanic time constant thereof. A failed motor current detection circuit is detected by comparing a motor current detected by the forcible drive with a current ($I_{cal}$) estimated from the battery voltage and the duty ratio of the PWM. Further, the motor current control can be continued (alternate control) based on an output from the motor current detection circuit that is determined normal in place of the motor current detection circuit that is determined defective.

Figure 3:
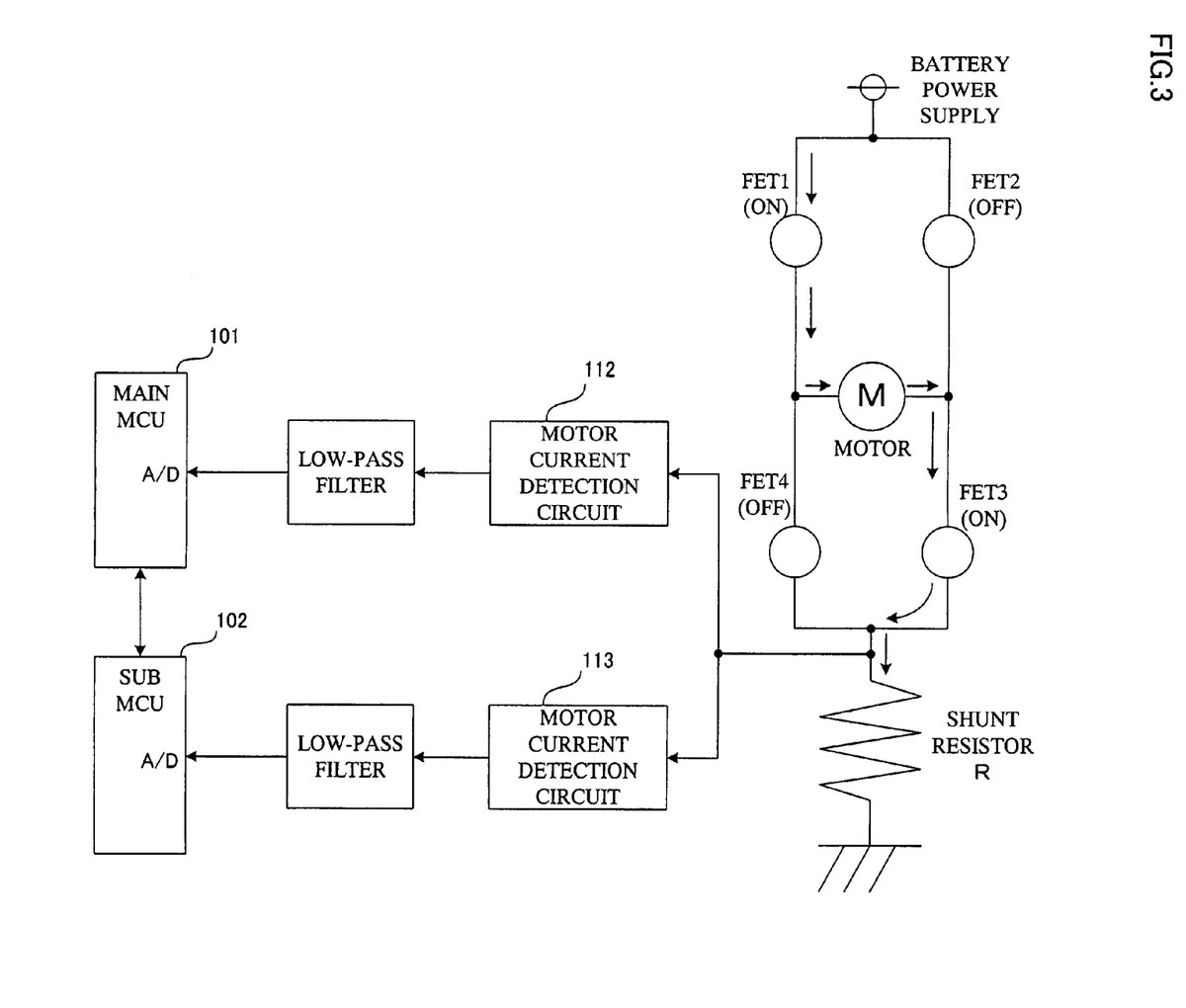
FIG. 3 shows a controller using two MCUs of a first embodiment of the present invention.

FIG. 3 shows a controller using two MCUs of a first embodiment of the present invention.

A motor current signal detected by a single current detecting resistor (shunt resistor) is input to two motor current detection circuits 112 and 113, respectively, noise is removed therefrom by low-pass filters, and outputs from the low-pass filters are input to a main MCU 101 and a sub MCU 102, respectively.

The main MCU 101 executes motor current control based on the motor current detection signal input thereto. Further, the motor current detection value input to the main MCU 101 is input to the sub MCU 102 through a serial signal connected between the main MCU 101 and the sub MCU 102.

A method of determining a failure of the motor current detection circuits by a controller of an electric power steering apparatus according to the present invention will be explained in detail with reference to a flowchart of FIG. 4. Signs "M" or "S" attached to the left shoulder of processing at each step shows an MCU in which the processing is executed. That is, "M" shows the main MCU, and the "S" shows the sub MCU. This also applies to the flowcharts of FIGS. 5 to 7 likewise.

The motor current detection signal detected by the shunt resistor is input to the motor current detection circuits 112 and 113 and read by the main MCU 101 and the sub MCU 102 passing through the low pass filters (steps S401, S402).

The respective read signals ($I_{main}$ and $I_{sub}$) are stored in memory means (not shown) inside the respective MCUs (steps S403, S404).

Next, the current detection value $I_{main}$ read by the main MCU 101 is transmitted to the sub MCU 102 (step S405). The sub MCU 102, which has received the current detection value $I_{main}$ (step S406), stores it in the memory means (not shown) inside the sub MCU (step S407). The sub MCU determines whether a difference between $I_{main}$ and $I_{sub}$ exceeds a predetermined value ($\Delta I_{det}$) (step S408).

When the difference between $I_{main}$ and $I_{sub}$ is equal to or less than the predetermined value, it is determined that the motor current detection circuits are normal, and ordinary processing is executed (step S409). When, however, the difference between $I_{main}$ and $I_{sub}$ exceeds the predetermined value (determination at step 408 is YES), the sub MCU inputs a motor drive prohibition signal Mp to a motor drive circuit 110 and executes failsafe processing for turning off a relay ON/OFF signal (step S410). Further, the sub MCU notifies the main MCU that the motor current detection circuit of the main MCU fails through a serial communication (step S411). The main MCU, which has been notified of it from the sub MCU, interrupts assist control as well as executes the failsafe processing for turning off a motor drive signal Ir and the relay ON/OFF signal (step S412).

Figure 5:
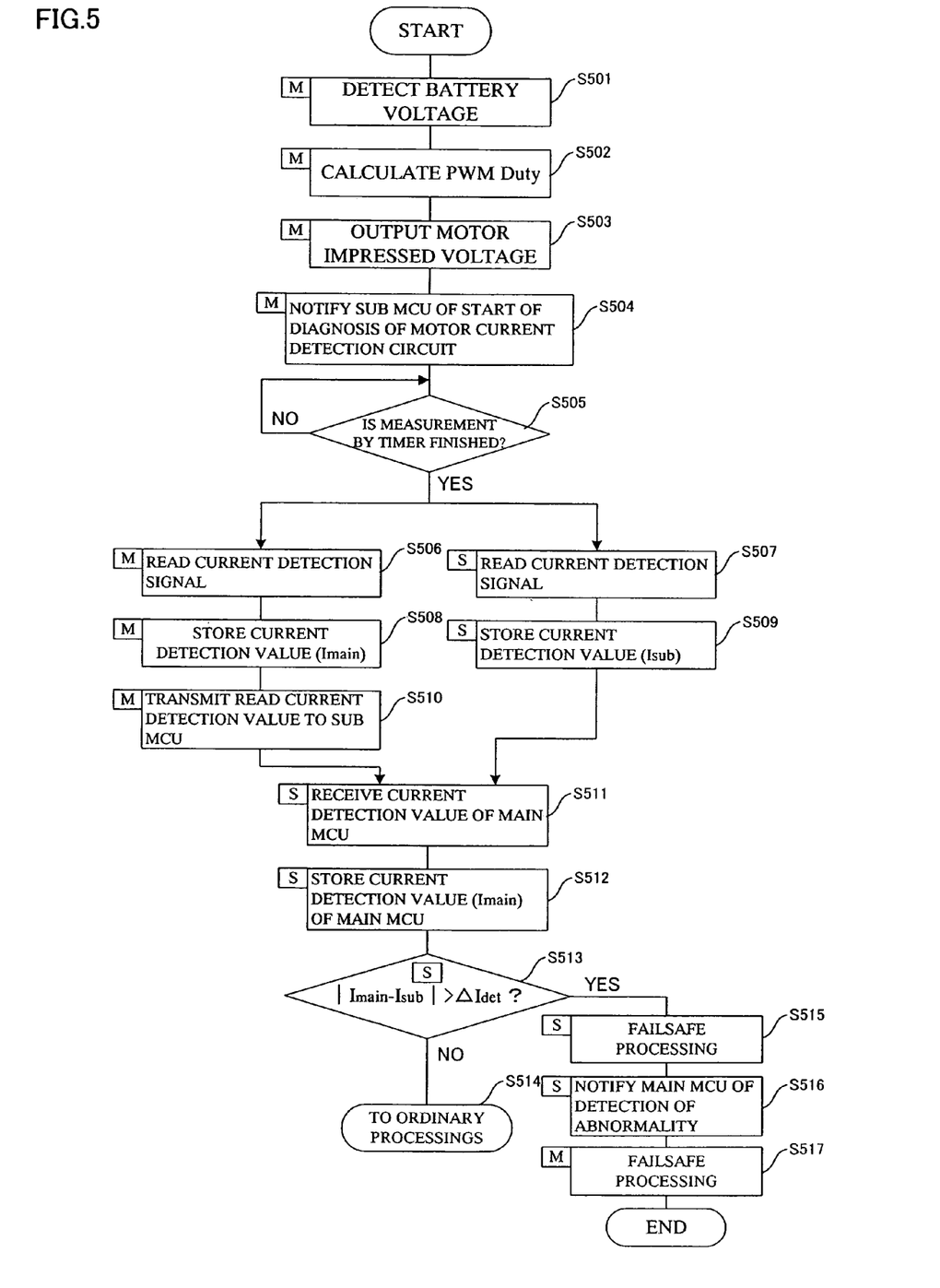
FIG. 5 is a flowchart showing a sequence of initial diagnosis of a failure of the motor current detection circuits.

FIG. 5 is a flowchart of failure diagnosis (initial diagnosis) in a state that the assist control is not yet executed just after a power supply is turned on. The initial diagnosis will be explained with reference to the drawing. Since no torque is generated in the initial state, no current flows to a motor. Accordingly, a failure diagnosing current must be caused to forcibly flow to the motor.

For this purpose, first, the main MCU 101 detects a battery voltage to determine a duty of a PWM for causing the current to flow to the motor (Step S501).

Next, the main MCU calculates the duty of the PWM necessary to cause the current to flow to the motor based on the battery voltage read thereby (step S502), outputs the calculated duty of the PWM, and applies a voltage to the motor (step S503). Note that, in this case, the duty of the PWM is calculated and set such that the current flows to the motor for a period of time longer than an electric time constant of the motor and shorter than a mechanical constant thereof.

Further, the main MCU sends a message that "at present, the calculated duty is being applied to the motor" to the sub MCU through a serial communication (step S504). After a predetermined period of time has passed (determination at step S505 is YES), the main MCU and the sub MCU read a present motor current detection value, respectively (steps S506, S507). Explanation of processings executed thereafter is omitted because they are the same as those of the flowchart of FIG. 4.

Figure 4:
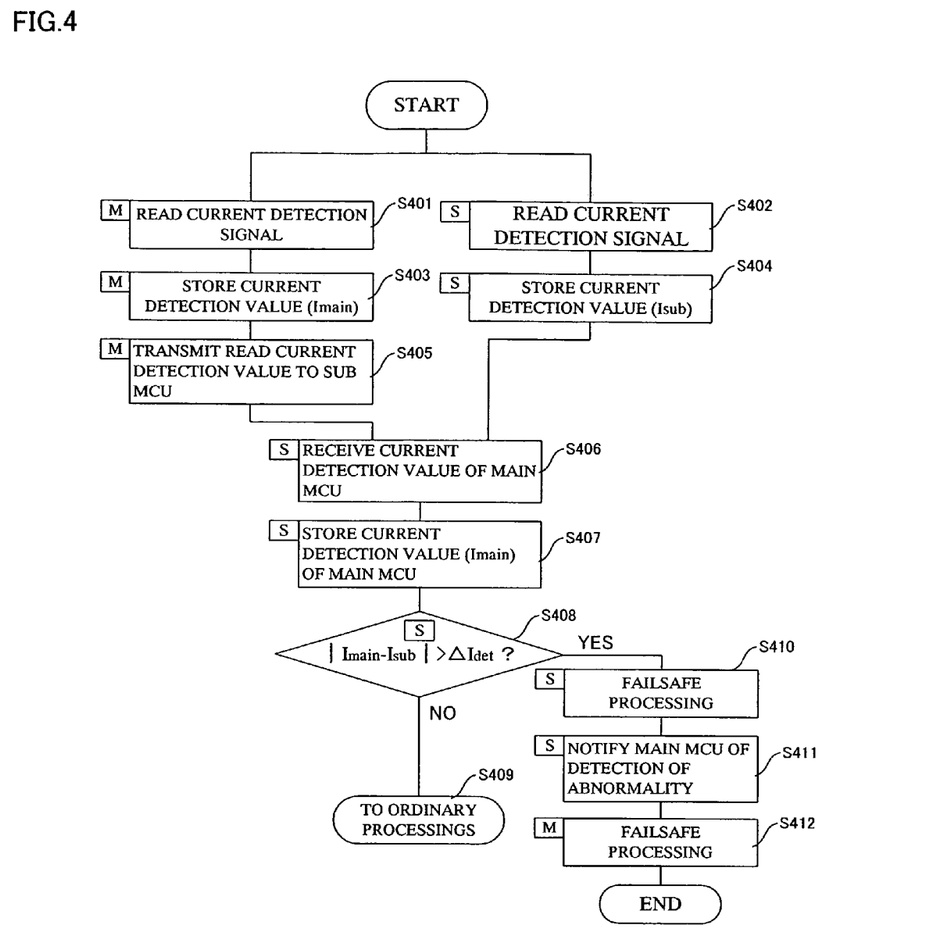
FIG. 4 is a flowchart showing a sequence for determining a failure of motor current detection circuits according to the present invention.

In the flowchart of FIG. 4 or 5, when it is found as a result of the failure diagnosis that at least any one of the motor current detection circuits fails, the assist control is interrupted by executing the failsafe processing. In the processings, which will be executed based on the flowcharts of FIGS. 6 and 7 explained below, however, the assist control is not interrupted at once even if a failure of any one the motor current detection circuits is found. In the processings, first, the motor current detection circuit, which actually fails, is identified as well as it is diagnosed whether or not the other motor current detection circuit fails. When it operates normally, motor current control is executed based on an output from the motor current detection circuit which is determined normal in place of the motor current detection circuit which is determined defective, thereby the assist control is continued (alternate control).

Note that the processings executed according to the flowchart of FIG. 5 execute the initial diagnosis for diagnosing whether any of the main MCU and the sub MCU fails. However, the processings shown in the flowchart of FIG. 6, which will be described below, maybe executed from the beginning to identify a failed MCU on the premise that any one of the main MCU and the sub MCU fails (processings executed at step 604 and subsequent steps). This is because that when a failed MCU is found in the processings of FIG. 5, the flow goes to the failed MCU identifying processings of FIG. 6, whereas when no failed MCU is found, ordinary processings are continued as they are.

Figure 6:
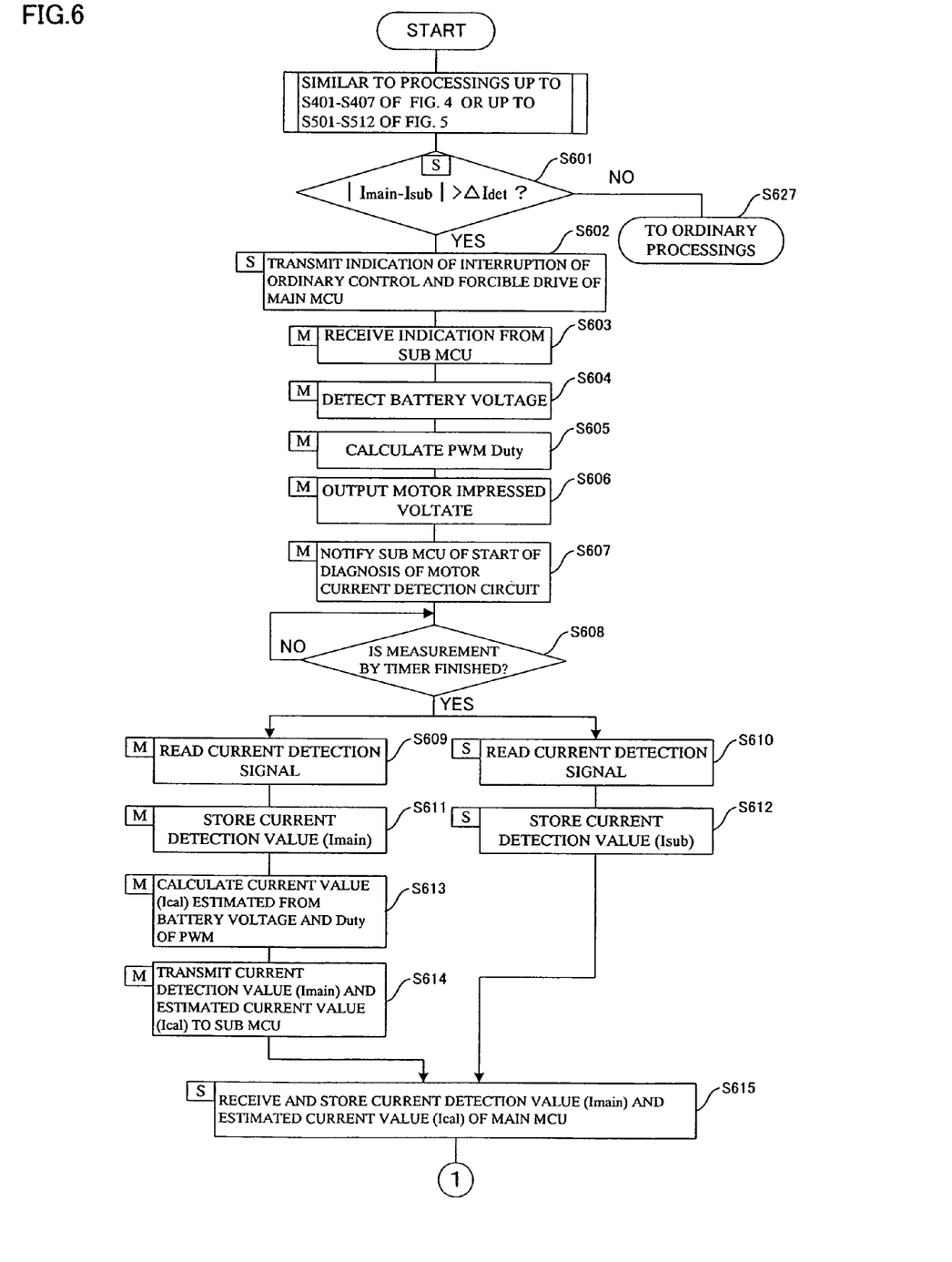
FIG. 6 is a flowchart showing a sequence for identifying a failed motor current detection circuit and for executing alternate control thereafter.
Figure 7:
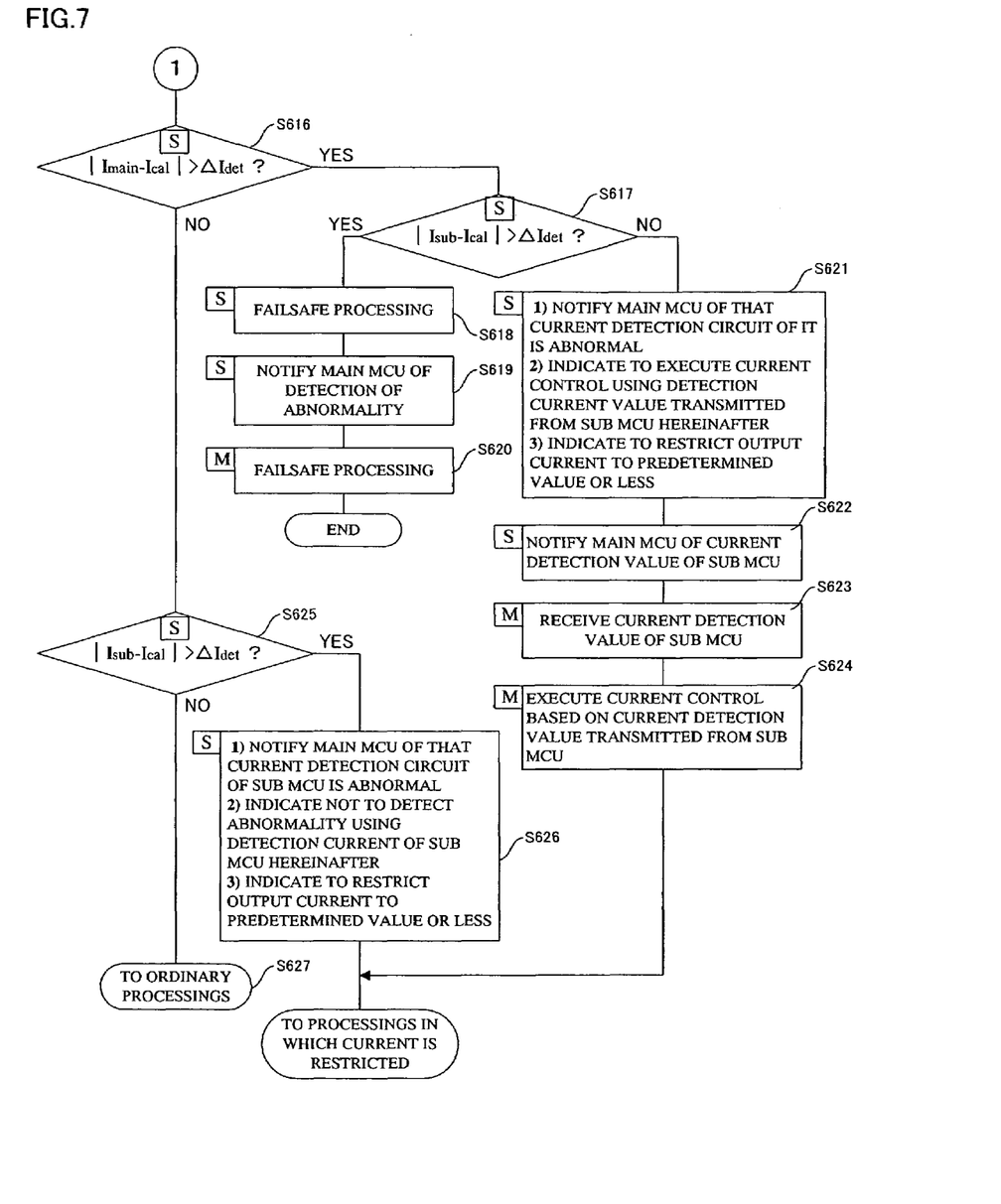
FIG. 7 is a flowchart continuing from that shown in FIG. 6.

Identification and alternate control of the failed motor current detection circuit will be explained below with reference to FIGS. 6 and 7.

Since the flow up to the processings in which the sub MCU 102 receives the current detection value ($I_{main}$) of the main MCU and compares it with the current detection value ($I_{sub}$) thereof is the same as that of the processings at the steps S401 to 407 of FIG. 4 or as that of the processings at the steps S501 to S512 of FIG. 5, explanation of the flow is omitted. When determination at step S601 is YES, that is, when it is determined that at least any one of the motor current detection circuits fails, the sub MCU transmits an indication for interrupting ordinary control processings and an indication of a forcible drive to the main MCU (step S602).

On receiving the indications from the sub MCU (step S603), the main MCU detects a battery voltage at the time to determine a duty of a PWM for outputting a motor impressed voltage (Step S604).

Next, the main MCU calculates the duty of the PWM necessary to output the motor impressed voltage based on the battery voltage read thereby (step S602), outputs the calculated duty of the PWM, and applies a voltage to the motor (step S606).

Further, the main MCU sends a message that "at present, the calculated duty is being applied to the motor" to the sub MCU through a serial communication (step S607). After a predetermined period of time has passed (determination at step S608 is YES), the main MCU and the sub MCU read a present motor current detection value, respectively (steps S609, S610). The respective read signals ($I_{main}$ and $I_{sub}$) are stored in memory means (not shown) inside the respective MCUs (steps S611, S612).

Next, the main MCU calculates an estimated current value ($I_{cal}$) from the detected battery voltage and the duty ratio of the PWM (step S613) and transmits it to the sub MCU together with the motor current detection value ($I_{main}$) (step S614).

In contrast, the sub MCU receives the motor current detection value ($I_{main}$) and the estimated current value ($I_{cal}$) that is transmitted at step S614 and stores them in the memory means (not shown) inside it (Step S615). A procedure for identifying a failed current detection circuit by comparing the estimated motor current value ($I_{cal}$), which is generated when the predetermined motor impressed voltage is output, with the actual motor current detection value ($I_{main}$ or $I_{sub}$).

First, at step S616, it is determined whether or not a difference between the current detection value $I_{main}$ and the estimated motor current value $I_{cal}$ does not exceed a predetermined value. When the difference exceeds the predetermined value, it is determined that the motor current detection circuit on the main MCU side fails (determination at step S616 is YES). Next, at step S617, it is determined whether or not a difference between the current detection value $I_{sub}$ and the estimated motor current value $I_{cal}$ does not exceed the predetermined value. This determination is executed to examine whether or not the motor current detection circuit on the sub MCU side fails.

When it is determined that the difference between the current detection value $I_{sub}$ and the estimated motor current value $I_{cal}$ exceeds the predetermined value (determination at step S617 is YES), it is determined that the motor current detection circuit on the sub MCU side also fails. At the time, failsafe processing and the like are executed at steps S618 to S620, and the system is interrupted. Since the contents of the failsafe processing and the like are the same as those of the processings at steps S410 to S412 described above, explanation of it is omitted.

In contrast, when the difference between the current detection value $I_{sub}$ and the estimated motor current value $I_{cal}$ is equal to or less than the predetermined value, it can be determined that the motor current detection circuit on the sub MCU side is normal, the motor current control is executed based on an output of the motor current detection circuit on the sub MCU side, and processings from step S612 to step S624 described below are executed to continue the assist control.

That is, the sub MCU notifies the main MCU of that the motor current detection circuit on the main MCU fails and indicates the main MCU to execute the current control using a current detection value transmitted from the sub MCU hereinafter as well as indicates it to restrict an output current to a predetermined value or less (step S621). Next, the current detection value of the sub MCU is transmitted to the main MCU (step S622). In contrast, the main MCU receives the current detection value transmitted from the sub MCU (step S623) and executes the current control based on the current detection value (step S624).

In contrast, when it is determined at step S616 that the motor current detection circuit on the main MCU side is normal (determination at step S616 is NO), it is examined whether or not the difference between the current detection value $I_{sub}$ and the estimated current value $I_{cal}$ does not exceed the predetermined value. This determination is executed to examine whether or not the motor current detection circuit on the main MCU side fails.

When the difference between the current detection value $I_{sub}$ and the estimated current value $I_{cal}$ exceeds the predetermined value (determination at step S625 is YES), it is determined that the motor current detection circuit on the sub MCU fails. Accordingly, it is notified to the main MCU that the motor current detection circuit of the sub MCU is abnormal and it is indicated to the main MCU not to execute abnormal diagnosis using the current detection value of the sub MCU thereafter as well as it is indicated thereto to restrict the output current the predetermined value or less (step S626).

It is possible to execute the alternate control as described above.

In contrast, when the difference between the current detection value $I_{sub}$ and the estimated current value $I_{cal}$ is equal to or less than the predetermined value, since it is determined that the motor current detection circuit on the sub MCU side is also normal, ordinary processings are executed continuously (step S627).

Figure 8:
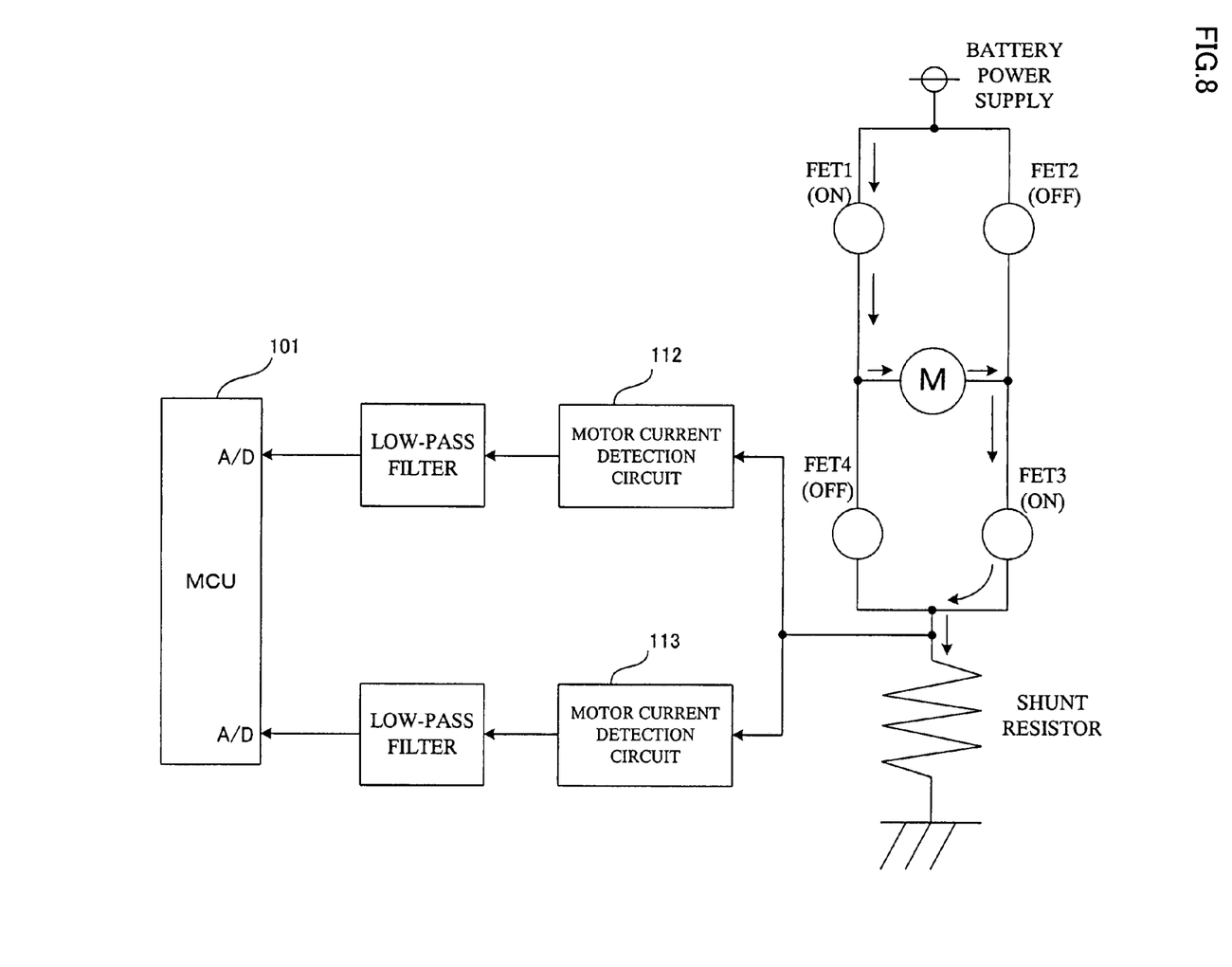
FIG. 8 shows a second embodiment of the present invention.

FIG. 8 is shows a second embodiment of the controller of the electric power steering apparatus according to the present invention, wherein outputs from two motor current detection circuits are input to a single MCU. In this case, although two motor current detection values are compared with each other in the single MCU, it is apparent that this is substantially the same as the above case in which they are compared with each other in the two MCUs.

INDUSTRIAL APPLICABILITY

As described above, according to the controller for the electric power steering apparatus of the present invention, there can be obtained an effect of accurately detecting a failure of the current amplifiers of the motor current detection circuits and detecting abnormality of the motor current detection circuits even while a steering operation is being executed as well as executing the alternate control when a failure is detected.

What is claimed is:

1. A controller for an electric power steering apparatus for controlling a motor so that a steeling assist power is applied to a steering mechanism based on a current command value calculated from a steering assist command value calculated based on a steering torque, which is generated in a steering shaft, and from a motor current detection value, characterized by comprising a function for determining a failure of a plurality of motor current detection circuits by detecting a current flowing to the motor by a single current detecting resistor, inputting the detected signal to the motor current detection circuits in parallel, and comparing outputs from the motor current detection circuits.

2. A controller for an electric power steering apparatus according to claim 1, characterized by comprising two MCUs, i.e. a main MCU and a sub MCU, wherein the plurality of motor current detection circuits are composed of two motor current detection circuits, one of output data of the two motor current detection circuits is input to the main MCU, the other output data is input to the sub MCU, the data of at least any one of the MCUs is sent to the other MCU through a communication therebetween, the other MCU determines a difference between the data, and when the difference exceeds a predetermined value, it is determined that at least one of the motor current detection circuits fails.

3. A controller for an electric power steering apparatus according to claim 2, characterized in that, in initial diagnosis of the failure of the motor current detection circuits, a current is caused to flow to the motor for a period of time longer than an electric time constant of the motor and shorter than a mechanical time constant thereof, as a result, the data of at least any one of the MCUs of output data of the two motor current detection circuits which are input to the main MCU and the sub MCU, respectively, is sent to the other MCU through a serial communication therebetween, the other MCU determines a difference between the respective data, and when the difference exceeds a predetermined value, it is determined that at least one of the motor current detection circuits fails.

4. A controller for an electric power steering apparatus according to claim 3, characterized in that when the two data are compared with each other and a difference therebetween exceeds a predetermined value, the motor current control, which is executed based on the current command value calculated from the steering assist command value calculated based on the steering torque and from the motor current command value, is interrupted, at least any one of the MCUs forcibly drives the motor in response to a PWM signal having a predetermined duty based on a battery voltage, and a failed motor current detection circuit is identified by comparing a current detected by the forcible drive with a current estimated from the battery voltage and the duty of the PWM.

5. A controller for an electric power steering apparatus according to claim 4, characterized in that the motor current control is continued based on an output from a motor current detection circuit which is determined normal in place of a motor current detection circuit whose failure is identified.

6. A controller for an electric power steering apparatus according to claim 2, characterized in that the data of at least one of the MCUs is sent to the other MCU through a serial communication therebetween executed at every predetermined time while a motor current is being controlled, the other MCU determines a difference between the respective data, and when the difference exceeds a predetermined value, it is determined that at least one of the motor current detection circuits fails.

7. A controller for an electric power steering apparatus according to claim 6, characterized in that when the two data are compared with each other and a difference therebetween exceeds a predetermined value, the motor current control, which is executed based on the current command value calculated from the steering assist command value calculated based on the steering torque and from the motor current command value, is interrupted, at least any one of the MCUs forcibly drives the motor in response to a PWM signal having a predetermined duty based on a battery voltage, and a failed motor current detection circuit is identified by comparing a current detected by the forcible drive with a current estimated from the battery voltage and the duty of the PWM.

8. A controller for an electric power steering apparatus according to claim 7, characterized in that the motor current control is continued based on an output from a motor current detection circuit which is determined normal in place of the motor current detection circuit whose failure is identified.

9. A controller for an electric power steering apparatus according to claim 2, characterized in that when the two data are compared with each other and a difference therebetween exceeds a predetermined value, the motor current control, which is executed based on the current command value calculated from the steering assist command value calculated based on the steering torque and from the motor current command value, is interrupted, at least any one of the MCUs forcibly drives the motor in response to a PWM signal having a predetermined duty based on a battery voltage, and a failed motor current detection circuit is identified by comparing a current detected by the forcible drive with a current estimated from the battery voltage and the duty of the PWM.

10. A controller for an electric power steering apparatus according to claim 9, characterized in that the motor current control is continued based on an output from a motor current detection circuit which is determined normal in place of a motor current detection circuit whose failure is identified.

* * * * *